US011260794B2

(12) United States Patent
Maruoka et al.

(10) Patent No.: US 11,260,794 B2
(45) Date of Patent: Mar. 1, 2022

(54) PERIPHERY MONITORING DEVICE

(71) Applicant: AISIN SEIKI KABUSHIKI KAISHA, Kariya (JP)

(72) Inventors: Tetsuya Maruoka, Okazaki (JP); Itsuko Fukushima, Anjo (JP); Kazuya Watanabe, Anjo (JP); Kinji Yamamoto, Anjo (JP); Takashi Hiramaki, Nagoya (JP); Naotaka Kubota, Aioi (JP)

(73) Assignee: AISIN CORPORATION, Kariya (JP)

( * ) Notice: Subject to any disclaimer, the term of this patent is extended or adjusted under 35 U.S.C. 154(b) by 260 days.

(21) Appl. No.: 16/477,919

(22) PCT Filed: Oct. 30, 2017

(86) PCT No.: PCT/JP2017/039196
§ 371 (c)(1),
(2) Date: Jul. 15, 2019

(87) PCT Pub. No.: WO2018/131263
PCT Pub. Date: Jul. 19, 2018

(65) Prior Publication Data
US 2019/0366929 A1 Dec. 5, 2019

(30) Foreign Application Priority Data
Jan. 16, 2017 (JP) .............................. JP2017-005097

(51) Int. Cl.
*B60R 1/00* (2006.01)
*B60D 1/36* (2006.01)
(Continued)

(52) U.S. Cl.
CPC .............. *B60R 1/003* (2013.01); *B60D 1/363* (2013.01); *B60R 11/04* (2013.01); *B60R 16/023* (2013.01);
(Continued)

(58) Field of Classification Search
None
See application file for complete search history.

(56) References Cited

U.S. PATENT DOCUMENTS 6,970,184 B2  11/2005  Hirama et al.
7,006,127 B2   2/2006  Mizusawa et al.
(Continued)

FOREIGN PATENT DOCUMENTS

JP  2002-312768 A  10/2002
JP  2002-359839 A  12/2002
(Continued)

OTHER PUBLICATIONS

International Search Report of PCT/JP2017/039196 dated Jan. 16, 2018 [PCT/ISA/210].

*Primary Examiner* — Rebecca A Volentine
(74) *Attorney, Agent, or Firm* — Sughrue Mion, PLLC

(57) ABSTRACT

A peripheral monitoring device according to one embodiment includes an acquirer configured to acquire a first rear image of a vehicle at first timing, the vehicle including a first coupler device which couples a towed vehicle; and an image processing unit configured to superimpose first identification information on the first rear image at second timing being after the first timing, the first identification information representing a position of the first coupler device at the second timing, and to display, on a display screen, the first rear image on which the first identification information has been superimposed, the display screen configured to be installed in the vehicle.

5 Claims, 11 Drawing Sheets

(51) Int. Cl.
*B60R 11/04* (2006.01)
*B60R 16/023* (2006.01)

(52) U.S. Cl.
CPC ... *B60R 2300/607* (2013.01); *B60R 2300/808* (2013.01); *B60R 2300/8026* (2013.01)

(56) References Cited

U.S. PATENT DOCUMENTS

| | | | |
|---|---|---|---|
| 7,204,504 | B2 | 4/2007 | Gehring et al. |
| 2002/0145663 | A1* | 10/2002 | Mizusawa ............... B60D 1/36 348/118 |
| 2013/0076007 | A1 | 3/2013 | Goode et al. |
| 2014/0071279 | A1 | 3/2014 | Mokashi et al. |
| 2016/0001704 | A1* | 1/2016 | Nakasho ............... B60R 1/00 701/36 |
| 2016/0009225 | A1* | 1/2016 | Watanabe ............... B60R 11/04 348/148 |
| 2016/0375831 | A1* | 12/2016 | Wang ............... B62D 15/0295 348/148 |

FOREIGN PATENT DOCUMENTS

| | | |
|---|---|---|
| JP | 3483143 B2 | 1/2004 |
| JP | 2006-001533 A | 1/2006 |

* cited by examiner

PERIPHERY MONITORING DEVICE

CROSS-REFERENCE TO RELATED APPLICATIONS

This application is national stage application of International Application No. PCT/JP2017/039196, filed Oct. 30, 2017, which designates the United States, and which claims the benefit of priority from Japanese Patent Application No. 2017-005097, filed Jan. 16, 2017.

TECHNICAL FIELD

An embodiment of the present invention relates to a peripheral monitoring device.

BACKGROUND ART

Conventionally, techniques are known, which image surrounding environment behind a vehicle with an imaging device installed in the vehicle to provide the driver with generated images via a display screen provided in a vehicle interior.

Conventionally, vehicles that can tow vehicles such as a camping car are also known.

CITATION LIST

Patent Literature

Patent Document 1: Japanese Laid-open Patent Publication No. 2002-359839
Patent Document 2: Japanese Patent No. 3483143
Patent Document 3: Japanese Laid-open Patent Publication No. 2006-001533

SUMMARY OF INVENTION

Problem to be Solved by the Invention

A vehicle may be moved backward to a towed vehicle to couple a coupler of the vehicle and a coupler of the towed vehicle. In such a case, the driver needs to adjust the positions of both of the couplers while driving the vehicle.

An object of the present invention is to provide a peripheral monitoring device which can facilitate position adjustment of couplers for coupling a towed vehicle to a vehicle.

Means for Solving Problem

According to one embodiment of the present invention, as an example, a peripheral monitoring device includes an acquirer configured to acquire a first rear image of a vehicle at first timing, the vehicle including a first coupler device which couples a towed vehicle; and an image processing unit configured to superimpose first identification information on the first rear image at second timing being after the first timing, the first identification information representing a position of the first coupler device at the second timing, and display, on a display screen, the first rear image on which the first identification information has been superimposed, the display screen configured to be installed in the vehicle. A driver can check the position of the first coupler device on the display screen in real time. Thus, the peripheral monitoring device can facilitate the position adjustment of the coupler devices.

According to the peripheral monitoring device of one embodiment of the present invention, as an example, the vehicle includes an imaging device, the first coupler device is located in a dead zone of the imaging device, and the acquirer acquires the first rear image from the imaging device. The peripheral monitoring device can display the position of the first coupler on the display screen in real time while the first coupler is located in the dead zone of the imaging device. This makes it possible for the driver to check the position of the first coupler on the display screen in real time.

According to the peripheral monitoring device of one embodiment of the present invention, as an example, the image processing unit further superimposes second identification information on the first rear image. The second identification information extends from a distal end of a second coupler device to a ground. The second coupler device couples with the first coupler device of the towed vehicle. Consequently, the driver can intuitively recognize the height of the distal end of the second coupler by viewing the display screen.

According to the peripheral monitoring device of one embodiment of the present invention, as an example, the acquirer acquires a second rear image at third timing, the image processing unit displays the acquired second rear image on the display screen immediately after the third timing, the third timing is timing during an operation in a first mode, and the second timing is timing during an operation in a second mode different from the first mode. Consequently, while the peripheral monitoring device is operating in the first mode, the driver can check the state of an imaging region of the imaging device through a live image in real time.

According to the peripheral monitoring device of one embodiment of the present invention, as an example, the acquirer acquires an operation input for mode switch, an operation input for switching a range of a transmission mechanism of the vehicle from a reverse range to another range, an operation input for changing a tailgate from a closed state to an opened state, or detection information from a distance measuring device of the vehicle, the distance measuring device that detects a distance between the vehicle and the towed vehicle; and the peripheral monitoring device transitions from the first mode to the second mode on the basis of the acquired one of the operation inputs or the acquired detection information Consequently, the peripheral monitoring device can transition between the modes, triggered by various events.

DESCRIPTION OF EMBODIMENTS

A peripheral monitoring device according to the present embodiment mounted on a vehicle 1 will be described by way of example.

Embodiment

The vehicle 1 according to the embodiment may be, for example, may be, for example, an automobile including an internal combustion engine as a driving source, that is, an internal combustion engine automobile, or may be an automobile including an electric motor as a driving source, that is, an electric vehicle and a fuel battery automobile. The vehicle 1 may be a hybrid automobile including both of them as a driving source, or an automobile including another driving source. The vehicle 1 can include various transmissions, and various devices such as systems and components required for driving the internal combustion engine or the electric motor. Type, the number, and layout of devices involving the driving of wheels 3 of the vehicle 1 can be variously set.

Figure 1:
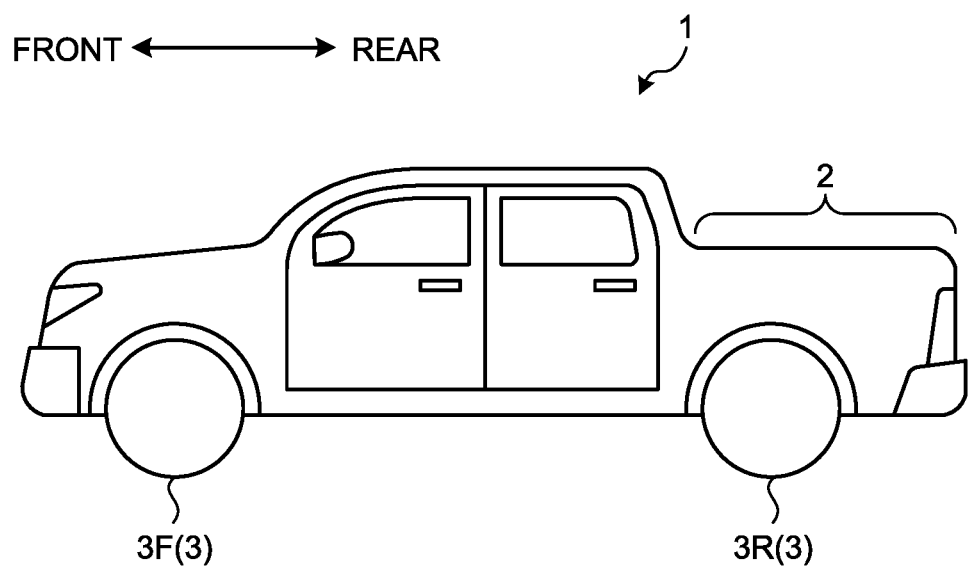
FIG. 1 is a side view illustrating a vehicle incorporating a peripheral monitoring device according to an embodiment.
Figure 2:
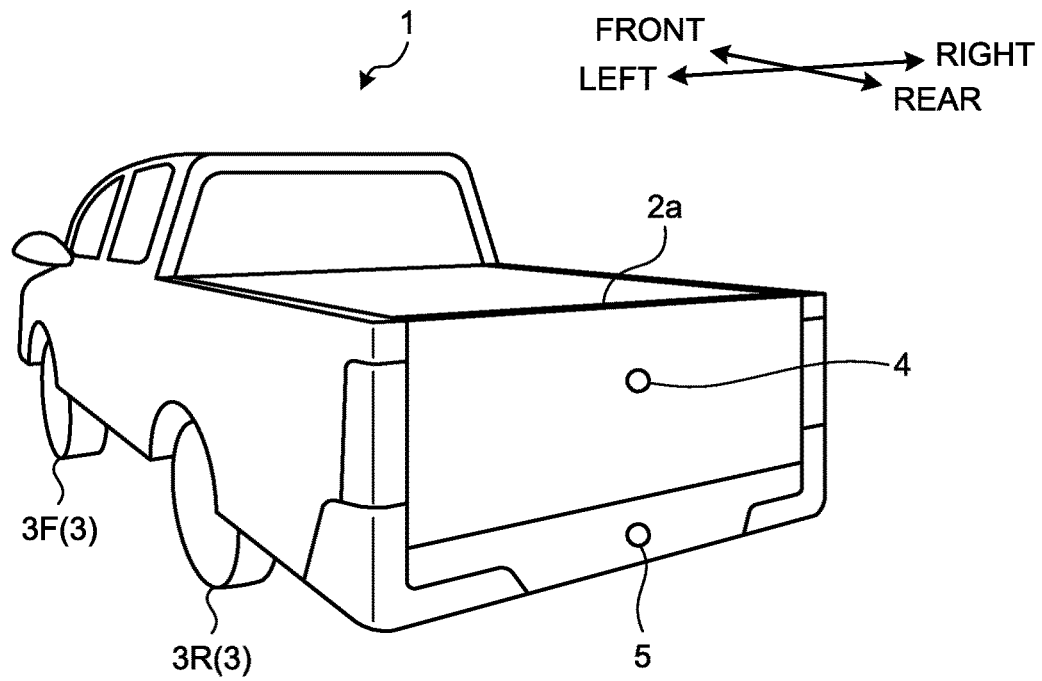
FIG. 2 is a perspective view illustrating from a left rear the vehicle incorporating the peripheral monitoring device according to the embodiment.
Figure 3:
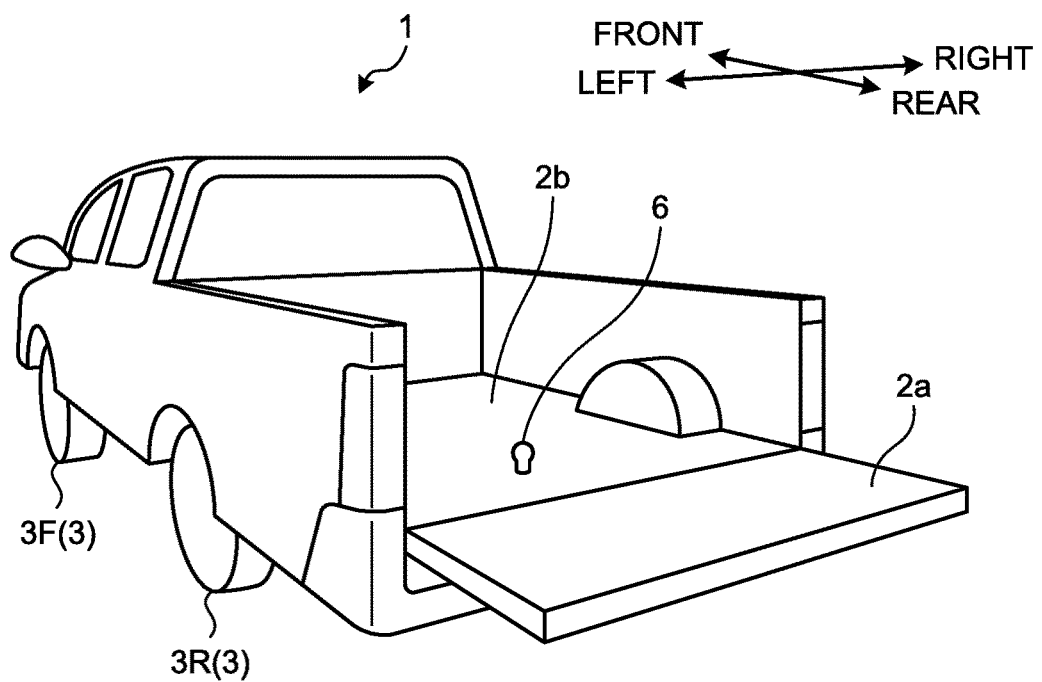
FIG. 3 is a perspective view illustrating from the left rear the vehicle incorporating the peripheral monitoring device according to the embodiment.
Figure 4:
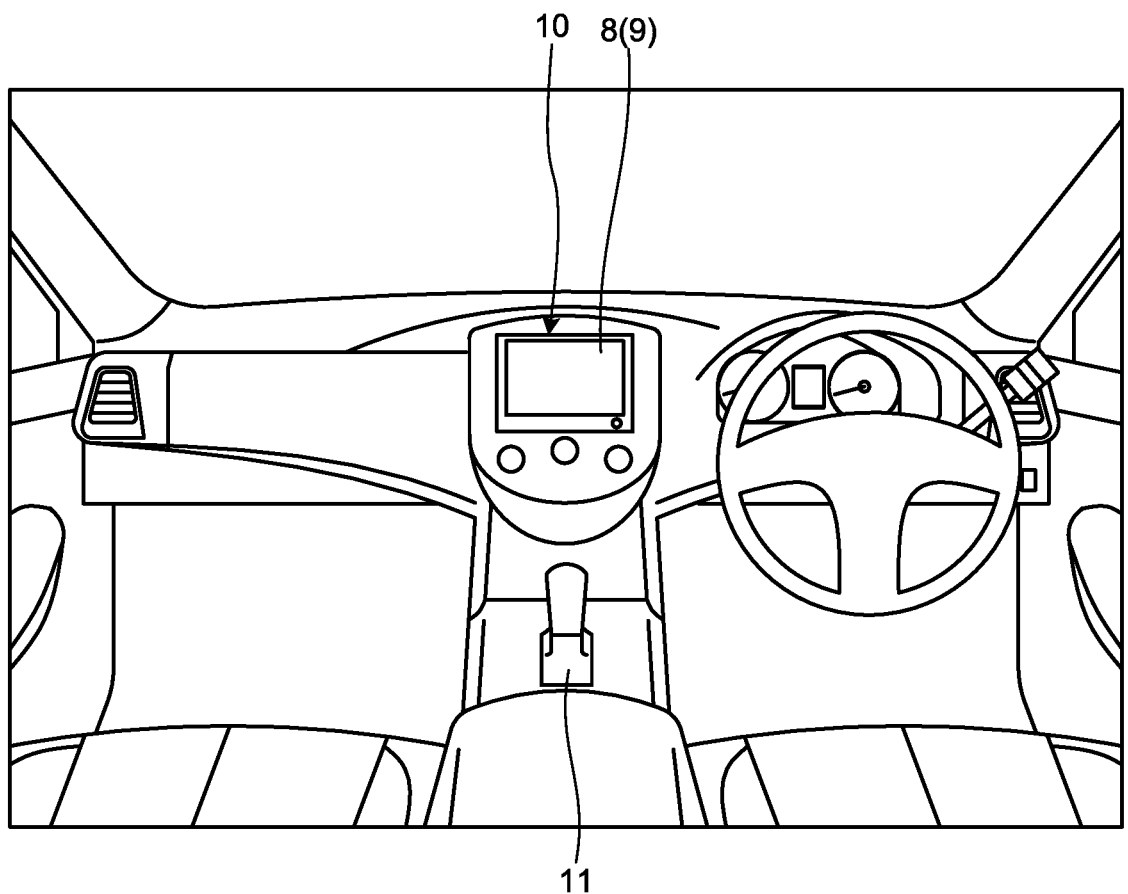
FIG. 4 is a view illustrating one example of a vehicle interior of the vehicle incorporating the peripheral monitoring device according to the embodiment.

FIG. 1 is a side view illustrating the vehicle 1 incorporating a peripheral monitoring device according to the embodiment. In FIG. 1, a leftward direction is defined to be frontward with respect to the vehicle 1, and a rightward direction is defined to be rearward with respect to the vehicle 1. FIGS. 2 and 3 are perspective views illustrating the vehicle 1 incorporating the peripheral monitoring device according to the embodiment from left rearward. In FIGS. 2 and 3 an upper left direction is defined to be frontward with respect to the vehicle 1, a lower left direction is defined to be leftward with respect to the vehicle 1, a lower right direction is defined to be rearward with respect to the vehicle 1, and an upper right direction is defined to be rightward with respect to the vehicle 1. FIG. 4 is a diagram illustrating one example of an interior of the vehicle 1 incorporating the peripheral monitoring device according to the embodiment, as viewed from the rear side of the vehicle 1.

The vehicle 1 incorporating the peripheral monitoring device according to the embodiment includes two right and left front wheels 3F and two right and left rear wheels 3R. The vehicle 1 is equipped with an openable bed 2 on the rear side. The vehicle 1 of this type is referred to as a pickup truck. A back panel (tailgate) 2a of the bed 2 is attached to a rear end of a bottom 2b of the bed 2 in an openable manner. FIGS. 1 and 2 illustrate the vehicle 1 with the back panel 2a in a closed state, and FIG. 3 illustrates the vehicle 1 with the back panel 2a in an open state.

A camera 4 is placed at a center of the back panel 2a. The camera 4 represents an imaging device including a built-in image sensor such as a charge coupled device (CCDs) or a CMOS image sensor (CIS). The camera 4 outputs an image generated by the image sensor at a predetermined frame rate to an electronic control unit (ECU) 12 described below. A direction of the camera 4, an angle of view of the camera 4 and an installation position of the camera 4 are determined to make it possible to generate an image of a region at a rear of surrounding environment of the vehicle 1. Consequently, the camera 4 can generate a rear image which is an image of the region at the rear of the vehicle 1. In addition, the installation position of the camera 4 is not limited to the center of the back panel 2a. Furthermore, the number of the camera 4 is not limited to one. The ECU 12 may generate the rear image by synthesizing images from a plurality of cameras 4.

A rear bumper of the vehicle 1 is provided with a sonar sensor 5. The sonar sensor 5 is a distance measuring device which measures a distance to an object at the rear of the vehicle 1. The distance measuring device can adopt other types of devices such as a laser range scanner and a stereo camera instead of the sonar sensor 5. The sonar sensor 5 outputs the detected distance as detection information. In addition, the installation position of the sonar sensor 5 is not limited to the above. Furthermore, the number of the installed sonar sensor 5 is not limited to one.

Furthermore, as illustrated in FIG. 4, the interior of the vehicle 1 is provided with a monitor device 10 including a display screen 8. The display screen 8 includes, for example, a liquid crystal display (LCD) or an organic electro-luminescent display (OELD). The display screen 8 is covered by a transparent operation input 9. The operation input 9 is, for example, a touch panel. A driver can view the image displayed on the display screen 8 via the operation input 9. Furthermore, by touching, pushing or moving the operation input 9 to operate at a position corresponding to the image displayed on the display screen 8, the driver can execute an operation input. The monitor device 10 is provided at a center in a vehicle width direction, i.e., horizontal direction of a dashboard. The monitor device 10 can include the operation input other than the touch panel. For example, the monitor device 10 may be provided with a switch, a dial, a joy stick or a push button as another operation input. The monitor device 10 can be used as both of, for example, a navigation system and an audio system.

Furthermore, in the vehicle interior, a center console is provided with a shift lever 11 for operating the transmission mechanism. When, for example, the transmission mechanism mounted on the vehicle 1 is an automatic transmission, the driver can select a desired range from a plurality of ranges including a parking range, a reverse range, a neutral range and a drive range by operating the shift lever 11. For example, when putting the shift lever 11 in the reverse range, the driver can move the vehicle 1 backward by operating an unillustrated accelerator pedal.

Furthermore, as illustrated in FIG. 3, a hitch ball 6 is attached to the bottom 2b of the bed 2. The hitch ball 6 is a coupler on a side of the vehicle 1 which couples the towed vehicle. Hereinafter, the towed vehicle will be described as a trailer.

Figure 5:
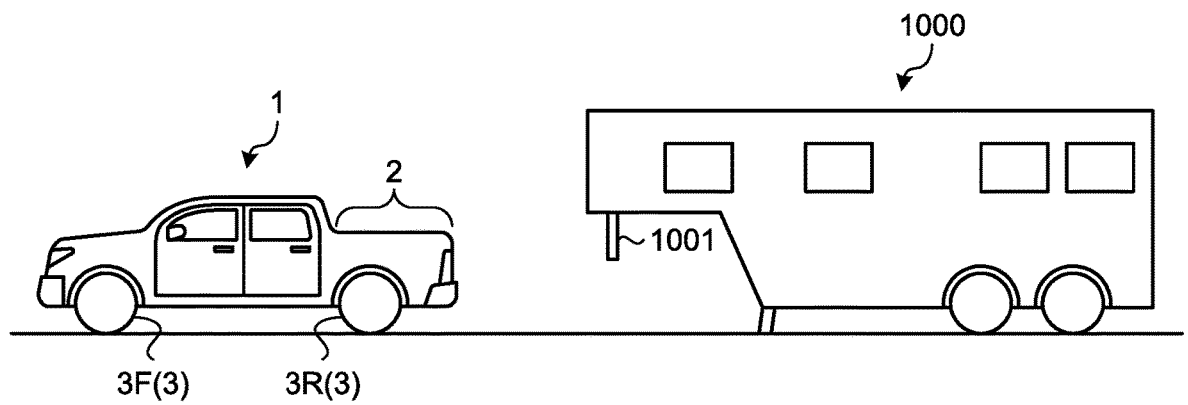
FIG. 5 is a view for illustrating one example of a trailer coupling method.
Figure 6:
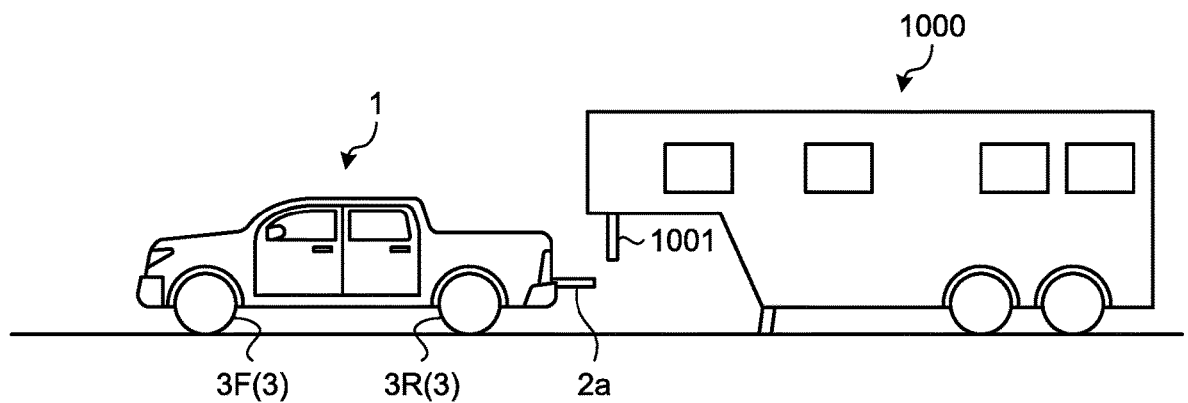
FIG. 6 is a view for illustrating one example of the trailer coupling method.
Figure 7:
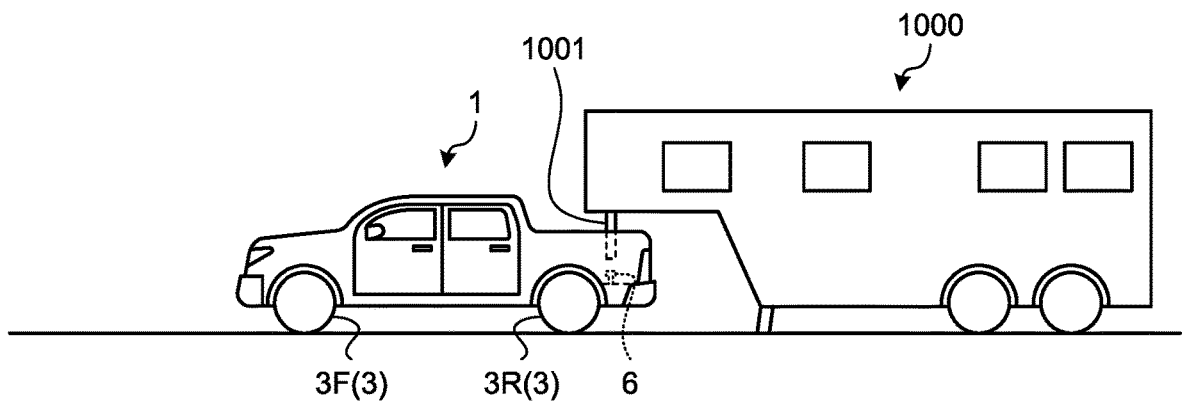
FIG. 7 is a view for illustrating one example of the trailer coupling method.

FIGS. 5 to 7 are views for illustrating one example of a method for coupling a trailer 1000. In examples in FIGS. 5 to 7, the coupling target trailer 1000 is a gooseneck type camping car. A coupler 1001, a coupler of the trailer 1000, is attached to a gooseneck part of the trailer 1000. The coupler 1001 has a columnar shape extending from the gooseneck part toward the ground. The distal end of the coupler 1001 is shaped to fit into the hitch ball 6. The coupler 1001 is attached to the gooseneck part so as to be extendable to the ground.

To perform a coupling operation, the driver first moves the vehicle 1 such that a front face of the trailer 1000 is located at a right rear of the vehicle 1. A positional relationship between the vehicle 1 and the trailer 1000 is in a state illustrated in FIG. 5. The driver moves the vehicle 1 backward toward the trailer 1000 in this state.

In the example in FIG. 5, the distal end of the coupler 1001 is at a position higher than the hitch ball 6, yet is at a position lower than an uppermost part of the back panel 2a in the closed state. Hence, when the vehicle 1 is moved backward to a predetermined position, the back panel 2a collides against the coupler 1001. Then, when the vehicle 1 and the trailer 1000 approach at a certain distance, the driver places the back panel 2a from the closed state to the opened state as illustrated in FIG. 6.

After placing the back panel 2a in the opened state, the driver moves the vehicle 1 backward toward the trailer 1000 again. After the bed 2 enters right below the coupler 1001, it is possible to place the back panel 2a in the closed state. The driver subsequently moves the vehicle 1 backward, and adjusts the positions of the hitch ball 6 and the coupler 1001. The position adjustment in this case refers to that the driver stops the vehicle 1 at a place at which the hitch ball 6 is located right below the distal end of the coupler 1001. FIG. 7 illustrates a state after the position adjustment is finished. After the position adjustment is finished, the driver fits the distal end of the coupler 1001 into the hitch ball 6 by stretching the coupler 1001 downward, and then couples both of the coupler 1001 and the hitch ball 6.

In addition, the hitch ball 6 is one example of the coupler for coupling the trailer 1000. In addition to the hitch ball 6, for example, a coupler referred to as a fifth wheel can be adopted. When the fifth wheel is adopted as the coupler of the vehicle 1, a kingpin can be adopted as the coupler of the trailer 1000.

Figure 8:
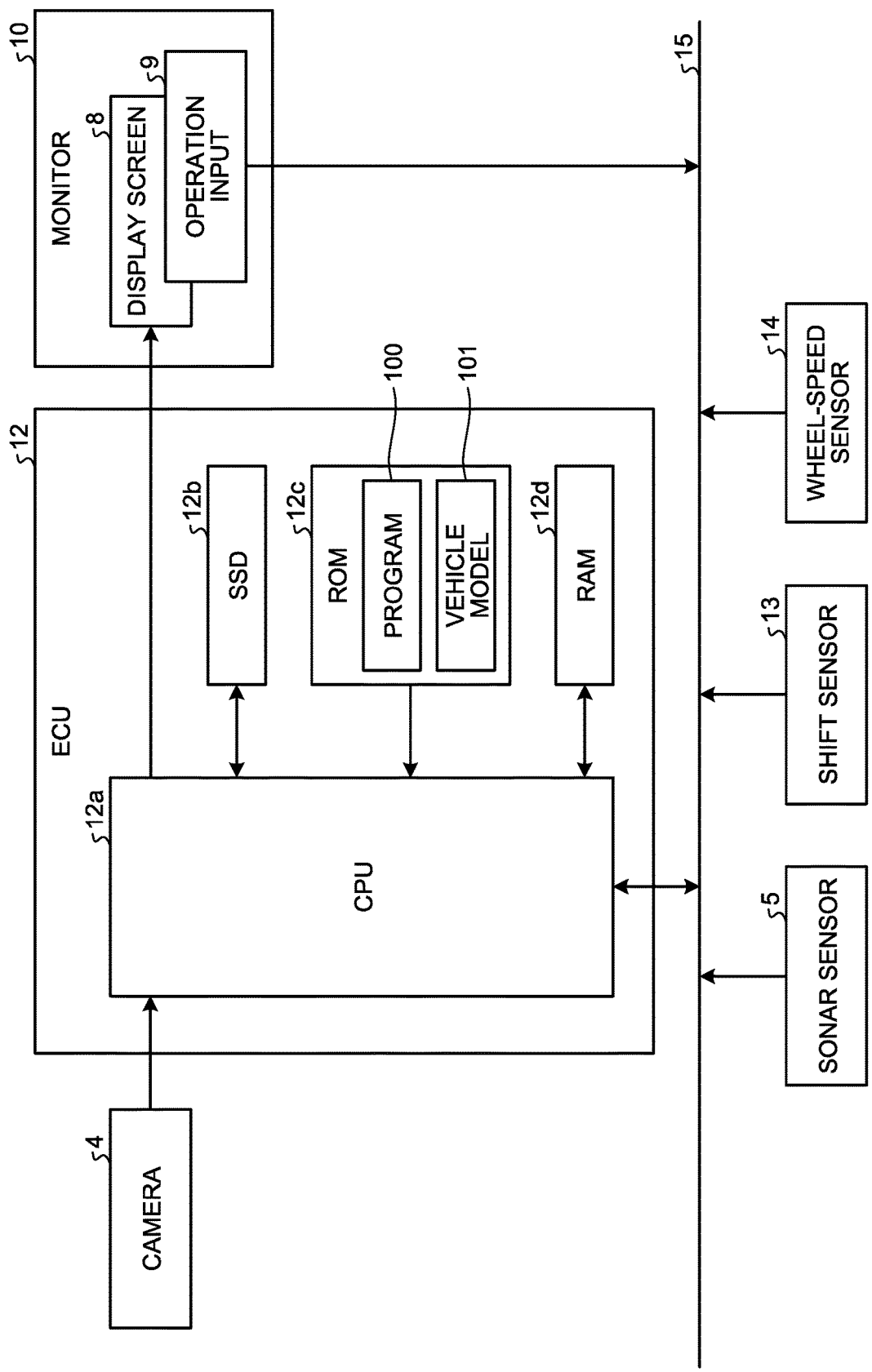
FIG. 8 is a block diagram illustrating one example of a configuration of a control system according to the embodiment.

The vehicle 1 is provided with a control system which controls the vehicle 1. FIG. 8 is a block diagram illustrating one example of a configuration of the control system according to the embodiment. The control system includes a camera 4, the sonar sensor 5 and the monitor device 10 and, in addition, the ECU 12, a shift sensor 13, a wheel-speed sensor 14 and an intra-vehicle network 15. The intra-vehicle network 15 is configured as, for example, a controller area network (CAN). The ECU 12, the sonar sensor 5, the shift sensor 13 and the wheel-speed sensor 14 are connected to the intra-vehicle network 15. The camera 4 is connected to the ECU 12. The monitor device 10 is connected to the ECU 12 and the intra-vehicle network 15. In addition, the control system includes an accelerator sensor, a brake system and a steering system.

The shift sensor 13 detects a range selected by the driver by detecting a position of the shift lever 11 operated by the driver.

The wheel-speed sensor 14 is a sensor which detects the rotational speed of the wheels 3 per unit time, and outputs the number of wheel-speed pulses indicating the rotational speed per unit time as detection information. The wheel-speed sensor 14 is provided to, for example, each of the four wheels 3.

The detection information of the sonar sensor 5, the shift sensor 13 and the wheel-speed sensor 14 is sent to the ECU 12 via the intra-vehicle network 15. The ECU 12 executes control of an engine unit, the steering system or the brake system according to the detection information.

The ECU 12 can receive an image from the camera 4. The ECU 12 can receive input information to the operation input 9 via the intra-vehicle network 15.

The ECU 12 includes a central processing unit (CPU) 12a, a solid state drive (SSD) 12b, a read only memory (ROM) 12c, and a random access memory (RAM) 12d. The CPU 12a, the ROM 12c and the RAM 12d may be integrated in the same package. The CPU 12a represents a processor which can execute any program. The SSD 12b, the ROM 12c and the RAM 12d are memories which can hold any program and any data. That is, the ECU 12 includes a hardware configuration identical to the computer.

The ECU 12 is one example of the peripheral monitoring device according to the embodiment. The ROM 12c stores a program 100 and a vehicle model 101 in advance. The CPU 12a reads the program 100 stored in advance in the ROM 12c, and executes the program 100 to implement the functions of the peripheral monitoring device. The RAM 12d temporarily stores various items of data used for an arithmetic operation in the CPU 12a. The SSD 12b may be a rewritable and non-volatile storage, and can maintain data stored by the CPU 12a when the ECU 12 is powered off. The program 100 or the vehicle model 101 may be stored in advance in the SSD 12b.

The ECU 12 which is the peripheral monitoring device uses the rear image generated by the camera 4 to display an image showing surrounding environment on the display screen 8.

For example, the ECU 12 displays on the display screen 8 each rear image outputted at a predetermined frame rate from the camera 4 immediately after obtaining each rear image. This display method will be referred to as a live mode. In a state illustrated in FIG. 5, the trailer 1000 is in an imaging region of the camera 4 provided to the back panel 2a. In this case, when the ECU 12 operates in the live mode, the driver can learn the real-time positional relationship between the vehicle 1 and the trailer 1000 via the display screen 8. In this regard, immediately means quickly to such a degree that the driver does not feel a time lag. Hence, in the live mode, as long as processing is sufficiently high speed processing, any image processing can be executed with respect to the rear image until the rear image is displayed on the display screen 8 after the rear image is obtained.

In this regard, when the coupler 1001 and the hitch ball 6 approach each other, the driver needs to check the positional relationship between the coupler 1001 and the hitch ball 6 for position adjustment. However, the imaging region of the camera 4 is at least on a rear side of the back panel 2a, and the hitch ball 6 is located in a dead zone of the camera 4. Thus, the ECU 12 cannot display the hitch ball 6 in the live mode. Furthermore, in the state illustrated in FIG. 7, the coupler 1001 also enters the dead zone of the camera 4, therefore, the ECU 12 cannot display the coupler 1001 in the live mode. Hence, in the live mode, the driver has difficulty in performing position adjustment based on the display on the display screen 8.

When the back panel 2a is in the opened state as illustrated in FIG. 6, the camera 4 is directed toward the ground, and therefore the trailer 1000 goes out of the imaging region of the camera 4. In this case, the ECU 12 cannot display the trailer 1000 in the live mode.

In view of this, the ECU 12 is configured to be able to operate in a past image mode in addition to the live mode.

The past image mode is a mode in which a rear image previously generated by the camera 4 is displayed. In the past image mode, the ECU 12 superimposes identification information indicating the position of the vehicle 1 on the previously generated rear image to enable the driver to check the real-time position of the vehicle 1 in the surrounding environment, and displays the rear image on which the identification information has been superimposed.

Figure 9:
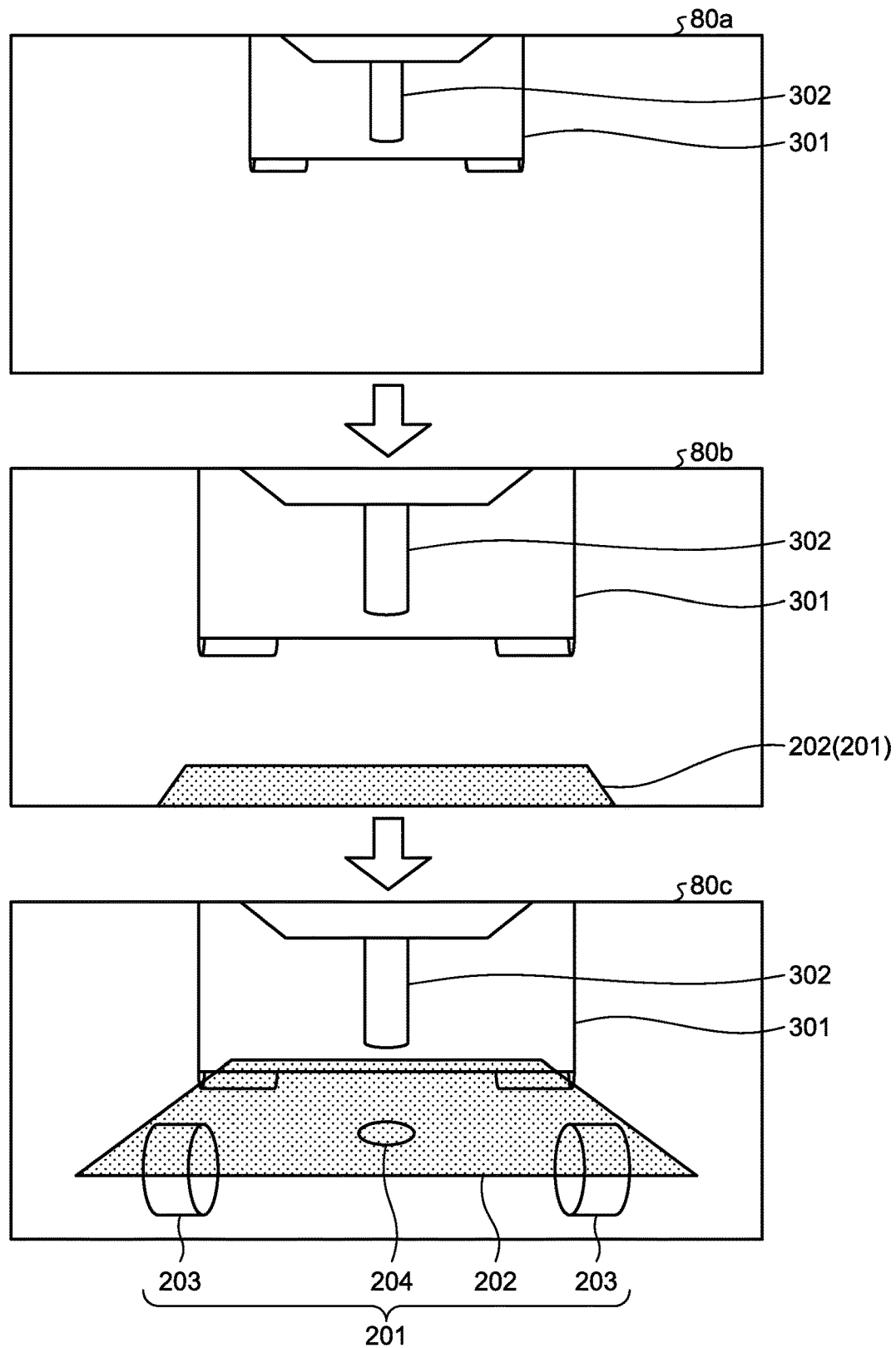
FIG. 9 is a view illustrating a transition of display contents on a display screen according to the embodiment.

FIG. 9 is a view illustrating a transition of display contents of the display screen 8 according to the embodiment. An image 80a shows display contents displayed in a state illustrated in FIG. 5. An image 80b shows display contents displayed in a state illustrated in FIG. 6. An image 80c shows display contents displayed in a state illustrated in FIG. 7. The image 80a is a display example in the live mode, and the image 80b and the image 80c are display examples in the past image mode.

The image 80a includes a trailer image 301. The trailer image 301 includes a coupler image 302 which is an image of the coupler 1001. The trailer image 301 is included in the rear image, and is a live image. That is, the trailer image 301 shows only a part included in the imaging region of the camera 4. By viewing the image 80a displayed on the display screen 8, the driver can determine the positional relationship between the trailer 1000 and the vehicle 1. In addition, part (e.g., a rear bumper) of the vehicle 1 may be in the imaging region of the camera 4, and an image of the rear bumper is included in the image 80a in this case.

In addition, a guide line indicating a distance from a rear end of the vehicle 1 may be superimposed and displayed on the image 80a. For example, three guide lines indicating positions of 0.5 m, 1 m and 1.5 m from the rear ends of the vehicle 1 may be superimposed and displayed on the image 80a.

The image 80b shows the trailer image 301 including the coupler image 302. The trailer image 301 including the coupler image 302 is a live image. The rear image (referred to as a base image below) which is base of the image 80b and has been previously generated is the rear image generated when the back panel 2a is in the closed state, and is, for example, the rear image generated immediately before the back panel 2a is placed in the opened state.

The image 80b further displays a bed model image 202 which is part of a vehicle model image 201. The vehicle model image 201 is exemplary identification information indicating the position of the vehicle 1.

The vehicle model image 201 includes a bed model image 202 of a shape imitating the outline of the bed 2 (more specifically, the bottom 2b of the bed 2), a rear wheel model image 203 of a shape imitating the outlines of the rear wheels 3R, and a hitch ball model image 204. The hitch ball model image 204 represents identification information for indicating the position of the hitch ball 6 in real time, and has a shape imitating the outline of an installation position of the hitch ball 6 as one example of this identification information.

When the vehicle 1 moves, the ECU 12 successively changes a display position of the vehicle model image 201 such that the position of the vehicle 1 after the movement in the imaging region of the base image, and the display position of the vehicle model image 201 in the base image match each other.

For example, the image 80b shows only part of the bed model image 202 at a lower end of a frame. This indicates that, at display timing of the image 80b, the vehicle 1 and the trailer 1000 are apart to such a degree that only part of the rear end of the bottom 2b of the bed 2 of the vehicle 1 enters the imaging region of the base image.

In addition, a display mode of the vehicle model image 201 is not limited to specific modes. The vehicle model image 201 may be displayed in a semi-transparent mode, or only a line indicating an outline may be displayed.

The image 80c shows the trailer image 301 including the coupler image 302. The base image of the image 80b and the base image of the image 80c are common, and the trailer image 301 including the coupler image 302 is displayed on the image 80c in the same mode as that of the image 80b. Furthermore, the vehicle model image 201 is superimposed on the image 80c.

In the case of the image 80c, the entire bed model image 202 is displayed. This indicates that, at the display timing of the image 80c, the vehicle 1 is close to the trailer 1000 to such a degree that the entire bottom 2b of the bed 2 of the vehicle 1 enters the imaging region of the base image.

Furthermore, a hitch ball model image 204 included in the vehicle model image 201 is displayed in the image 80c. The hitch ball model image 204 indicates a real-time position of the hitch ball 6 in the imaging region of the base image. The ECU 12 superimposes the hitch ball model image 204 indicating the real-time position of the hitch ball 6 on the previously generated image, and displays the hitch ball model image 204 on the display screen 8, so that the driver can check the real-time position of the hitch ball 6 provided to the dead zone of the camera 4 via the display screen 8.

Figure 10:
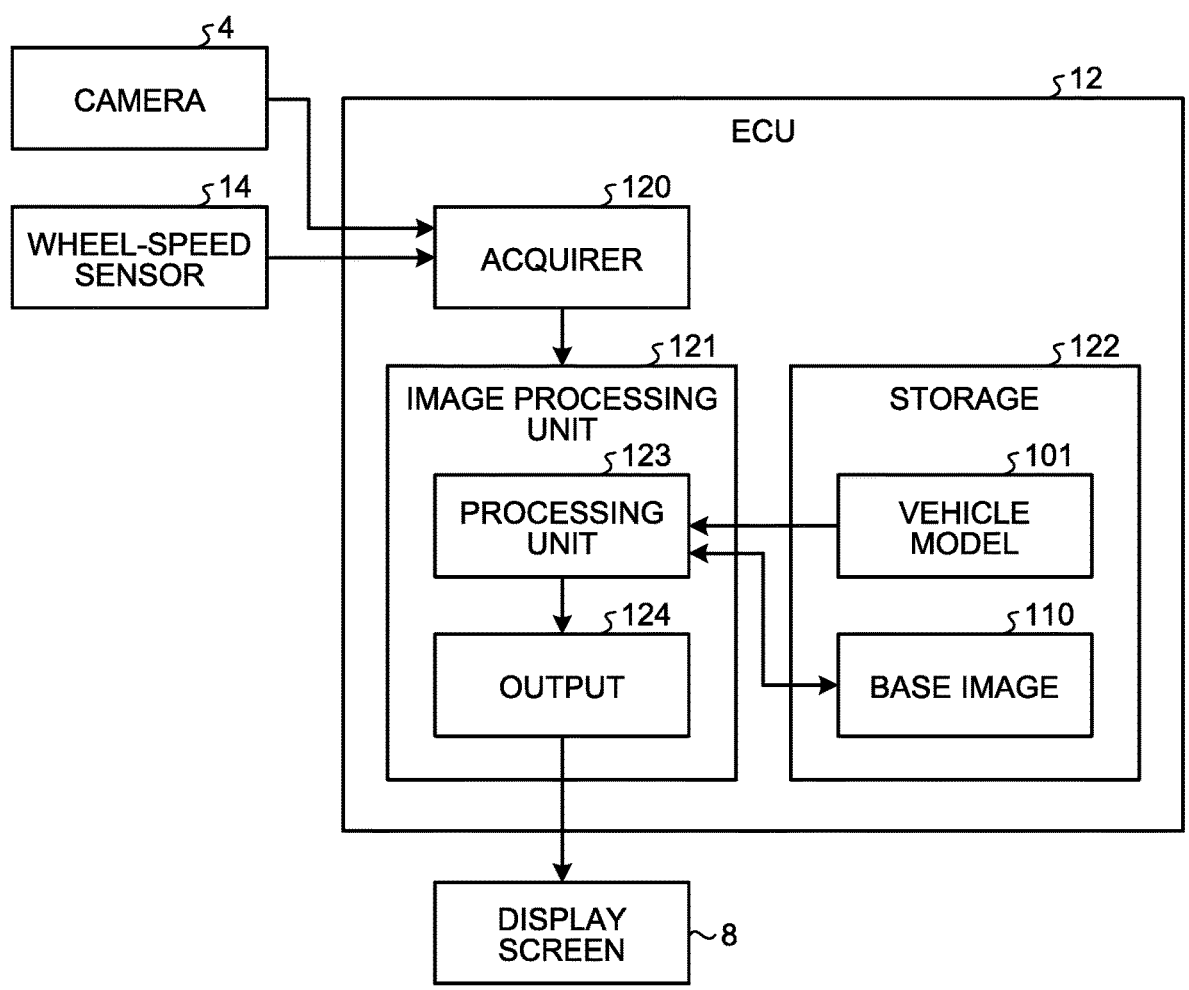
FIG. 10 is a block diagram illustrating a functional configuration of an ECU according to the embodiment.

FIG. 10 is a block diagram illustrating a functional configuration of the ECU 12 which is the peripheral monitoring device according to the embodiment. The CPU 12a executes the program 100 stored in advance in the ROM 12c to function as an acquirer 120 and an image processing unit 121. The image processing unit 121 includes a processing unit 123 and an output 124. Furthermore, the ECU 12 includes a storage 122 which stores the vehicle model 101 and a base image 110. The storage 122 is implemented by, for example, the SSD 12b, the ROM 12c, the RAM 12d, or a combination of these.

The vehicle model 101 represents three-dimensional information indicating the shape of the vehicle 1, and represents information for generating the vehicle model image 201. The vehicle model 101 is created in advance. Details of the vehicle model 101 will be described below.

The base image 110 is a rear image used in the past image mode.

The acquirer 120 acquires the rear image outputted from the camera 4, and detection information outputted from the wheel-speed sensor 14.

The image processing unit 121 controls display on the display screen 8 on the basis of each information acquired by the acquirer 120.

More specifically, in the live mode, the output 124 outputs the rear image acquired from the camera 4 to the display screen 8 immediately after timing at which this rear image has been acquired.

In the past image mode, the image processing unit 121 sets the rear image which has been previously acquired at previous timing to the base image 110, and the processing unit 123 superimposes the vehicle model image 201 indicating the position of the vehicle 1 at the current timing on the base image 110. The output 124 outputs to the display screen 8 an image generated by superimposing the vehicle model image 201 on the base image 110. In one example, the image processing unit 121 stores in the storage 122 the rear image acquired at timing at which the live mode transitions to the past image mode as the base image 110.

A method for generating the vehicle model image 201 is not limited to a specific method. One example of the method for generating the vehicle model image 201 will be described below.

The processing unit 123 sets a three-dimensional virtual space, and sets the vehicle model 101 and a virtual viewpoint 402 in a virtual space 400 when acquiring the base image 110.

Figure 11:
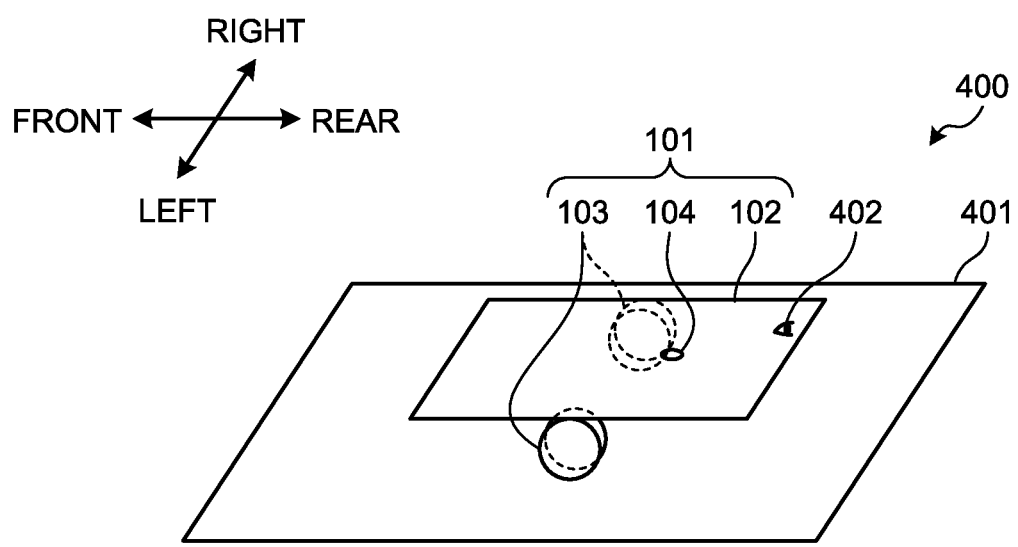
FIG. 11 is a view illustrating an exemplary arrangement of a vehicle model and a virtual viewpoint according to the embodiment.

FIG. 11 is a view illustrating an exemplary arrangement of the vehicle model 101 and a virtual viewpoint 402 in the embodiment.

In the virtual space 400, the vehicle model 101 is placed on a plane 401 corresponding to a ground. The vehicle model 101 includes a bed model 102 which has the shape which simulates the output line of the bottom 2b of the bed 2, a rear wheel model 103 which has the shape which simulates the outline of the rear wheel 3R, and a hitch ball model 104 which has the shape which simulates the outline of an installed location of the hitch ball 6. A positional relationship among the bed model 102, the rear wheel model 103, and the hitch ball model 104 corresponds to a positional relationship among actual positions of the bottom 2b of the bed 2, the rear wheels 3R, and the hitch ball 6 of the vehicle 1.

The position of the virtual viewpoint 402 based on the vehicle model 101 corresponds to the position of the camera 4 based on the vehicle 1. A direction of the virtual viewpoint 402 based on the vehicle model 101 corresponds to a direction of the camera 4 based on the vehicle model 101. An angle of view of the virtual viewpoint 402 is equal to an angle of view of the camera 4. Hence, a field of view from the virtual viewpoint 402 corresponds to a field of view from the camera 4.

The processing unit 123 computes a moving amount of the vehicle 1 from the timing at which the base image 110 has been generated after movement of the vehicle 1. The processing unit 123 computes the moving amount of the vehicle 1 by integrating the numbers of wheel-speed pulses per wheel 3. The moving amount represents a vector amount including direction information. The processing unit 123 moves the vehicle model 101 from an initial position by the amount corresponding to the computed moving amount while fixing the position of the virtual viewpoint 402 in the virtual space 400. The processing unit 123 then generates the vehicle model image 201 by converting the viewpoint using the virtual viewpoint 402.

The viewpoint conversion refers to acquiring an image showing a field of view from the virtual viewpoint 402 by perspective projection based on the virtual viewpoint 402 as the viewpoint. The image showing the field of view from the virtual viewpoint 402 has a frame. The field of view from the virtual viewpoint 402 corresponds to the field of view of the camera 4 at the time of generating the base image 110, so that the frame of the image showing the field of view from the virtual viewpoint 402 corresponds to the frame of the base image 110. When the vehicle model 101 is in the field of view from the virtual viewpoint 402, the frame includes the vehicle model image 201.

To superimpose the vehicle model image 201 on the base image 110, the processing unit 123 adjusts the positions of a frame of a two-dimensional plane on which the vehicle model 101 has been projected, and the base image 110. Thus, the vehicle model image 201 is superimposed on the base image 110 at the position corresponding to a real-time position of the vehicle 1. Similarly, the hitch ball model image 204 is superimposed on the base image 110 at the position corresponding to the real-time position of the hitch ball 6.

In addition, a moving amount computing method is not limited to a method which uses the number of wheel-speed pulses. As another example, a moving amount computing method based on an image outputted from the camera 4 is adoptable. More specifically, it is possible to compute an optical flow from two images generated at different timing, and compute the moving amount of the vehicle 1 during the time at which the images have been generated, from the computed optical flow. By this method, the processing unit 123 may compute the moving amount of the vehicle 1 from successively acquired rear images.

Figure 12:
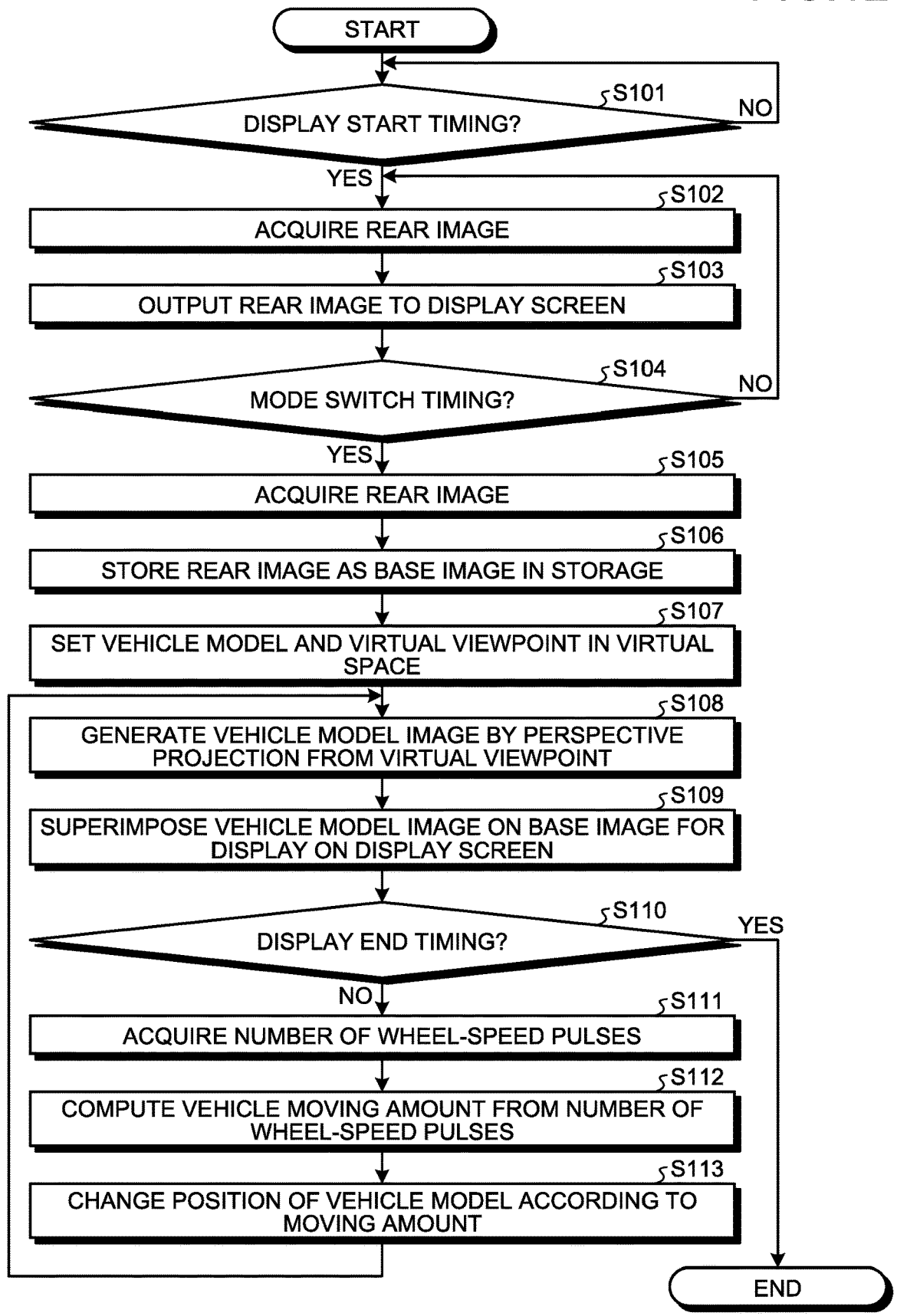
FIG. 12 is a flowchart for illustrating an operation of the ECU as the peripheral monitoring device according to the embodiment.

Next, an operation of the peripheral monitoring device according to the embodiment configured as described above will be described. FIG. 12 is a flowchart for illustrating an operation of the ECU 12 as the peripheral monitoring device according to the embodiment.

The image processing unit 121 determines whether or not now is display start timing (S101).

A display start timing decision method is not limited to a specific method. In one example, when the driver puts the shift lever 11 to the reverse range, the shift sensor 13 detects that the reverse range has been selected, and notifies the ECU 12 of the detection result. When the acquirer 120 receives the notification, the image processing unit 121 determines that now is the display start timing.

In another example, the image processing unit 121 displays a button which encourages an input of display start on the display screen 8. Furthermore, when the driver touches the button, the operation input 9 detects the touch, and notifies the ECU 12 of the detection result. The acquirer 120 receives the notification as a display start operation input. When the acquirer 120 receives the display start operation input, the image processing unit 121 determines that now is the display start timing.

After determining that now is not the display start timing (No in S101), the image processing unit 121 executes processing in S101 again.

When the image processing unit 121 determines that now is the display start timing (Yes in S101), the acquirer 120 acquires a rear image outputted from the camera 4 (S102). Then, the output 124 outputs the rear image acquired in S102 to the display screen 8 (S103).

Subsequently, the image processing unit 121 determines whether or not now is the mode switch timing (S104). After determining that now is not the mode switch timing (No in S104), the image processing unit 121 executes processing in S102 and S103, and then executes processing in S104 again.

The processing in S102 and S103 corresponds to the operation in the live mode. Loop processing from S102 to S104, No is repeatedly executed in a short cycle until control passes this loop processing. Until the control passes this loop processing, the operation in the live mode continues.

A mode-switch timing decision method is not limited to a specific method. In one example, the acquirer 120 acquires a mode switch operation input from the driver, and the image processing unit 121 determines the mode switch timing based on the mode switch operation input. More specifically, for example, the image processing unit 121 displays a button which encourages an input of the mode switch on the display screen 8. When the driver touches the button, the operation input 9 detects that the button has been touched, and notifies the ECU 12 of the detection result. The acquirer 120 receives the notification as the mode switch operation input. When the acquirer 120 receives the mode switch operation input, the image processing unit 121 determines that now is the mode switch timing.

In another example, the acquirer 120 acquires the operation input for switching a range of the transmission mechanism from the driver, and the image processing unit 121 determines the mode switch timing based on the operation input for switching the range of the transmission mechanism from the reverse range to another range. For example, the driver starts moving the vehicle 1 backward from a state illustrated in FIG. 5, subsequently stops the vehicle 1, gets off the vehicle 1 and manually places the back panel 2*a* from the closed state to the opened state. When the driver puts the shift lever 11 from the reverse range to the parking range to stop the vehicle 1, the shift sensor 13 detects that the parking range has been selected, and notifies the ECU 12 of the detection result. The acquirer 120 receives this notification as the operation input for switching the range of the transmission mechanism from the reverser range to another range. When the acquirer 120 receives the operation input for switching the range of the transmission mechanism from the reverser range to another range, the image processing unit 121 determines that now is the mode switch timing. In addition, the switched range may not necessarily be the parking range.

In still another example, the acquirer 120 acquires the operation input for placing the back panel 2*a* in the opened state, and the image processing unit 121 determines the mode switch timing based on the operation input for placing the back panel 2*a* in the opened state. More specifically, for example, a sensor is provided at a hinge of the back panel 2*a*. When the back panel 2*a* enters from the closed state to the opened state, the sensor detects the opened state, and notifies the ECU 12 of the detection result. The acquirer 120 receives this notification as the operation input for placing the back panel 2*a* in the opened state. When the acquirer 120 receives the operation input for placing the back panel 2*a* in the closed state, the image processing unit 121 determines that now is the mode switch timing.

A method for detecting the operation input for placing the back panel 2*a* in the opened state is not limited only to a method for performing detection by the sensor provided at the hinge of the back panel 2*a*. For example, an operation of an operation unit provided inside or outside of the vehicle 1 configures the back panel 2*a* in a openable manner in some cases. In this case, the acquirer 120 can acquire the operation input for placing the back panel 2*a* in the opened state via the operation unit.

In still another example, the acquirer 120 acquires detection information from the sonar sensor 5, and the image processing unit 121 determines the mode switch timing based on the detection information from the sonar sensor 5. More specifically, for example, the image processing unit 121 successively acquires the detection information from the sonar sensor 5. Detection information indicates a real-time distance from the vehicle 1 to the trailer 1000. The image processing unit 121 compares the real-time distance from the vehicle 1 to the trailer 1000 with a threshold, and determines that now is the mode switch timing when the distance falls below the threshold. The threshold for the determination is set to a value larger than the shortest distance that the coupler 1001 does not collide against the back panel 2*a* and does not interfere with an opening/closing operation of the back panel 2*a*. The threshold is set in advance, for example.

When the image processing unit 121 determines that now is the mode switch timing (Yes in S104), the ECU 12 starts the operation in the past image mode.

More specifically, first, the acquirer 120 acquires the rear image generated by the camera 4 (S105). Then, the image processing unit 121 stores the rear image acquired in S105 as the base image 110 in the storage 122 (S106).

Subsequently, the processing unit 123 sets the vehicle model 101 and the virtual viewpoint 402 in the virtual space 400 (S107). For example, as described with reference to FIG. 11, in S107, the processing unit 123 sets the vehicle model 101 in the virtual space 400, and the processing unit 123 sets the virtual viewpoint 402 at a position corresponding to the installation position of the camera 4.

Subsequently, the processing unit 123 generates the vehicle model image 201 by perspective projection from the virtual viewpoint 402 (S108).

The output 124 reads the base image 110 from the storage 122, superimposes the vehicle model image 201 on the read base image 110, and displays on the display screen 8 the base image 110 on which the vehicle model image 201 has been superimposed (S109).

Subsequently, the image processing unit 121 determines whether or not now is the display end timing (S110).

A display end timing decision method is not limited to a specific method. Similar to the display start timing, the image processing unit 121 may determine the display end timing based on the operation input inputted to the operation input unit 9, or may determine the display end timing based on the operation input for switching the range of the transmission mechanism.

When the image processing unit 121 determines that now is not the display end timing (No in S110), the acquirer 120 acquires the number of wheel-speed pulses (S111). The processing unit 123 computes the moving amount of the vehicle 1 based on the number of wheel-speed pulses (S112). The moving amount can be found by integrating the number of wheel-speed pulses.

In addition, processing from S108 to S113 via S110, No makes up the loop processing. That is, processing in S112 is repeatedly executed until the control passes this processing. In a case of second or subsequent loop processing, in S112, the processing unit 123 computes the moving amount of the vehicle 1 from the timing at which S112 has been previously executed. In a case of first loop processing, in S112, the processing unit 123 computes the moving amount of the vehicle 1 after the base image is acquired.

After the processing in S112, the processing unit 123 changes the position of the vehicle model 101 on the virtual space 400 according to the moving amount (S113). When, for example, the vehicle 1 is moved backward by the moving amount, the processing unit 123 moves the vehicle model 101 backward by a corresponding amount in the virtual space 400.

Furthermore, the control moves to S108, and the processing unit 123 creates the vehicle model image 201 again in S108.

When the image processing unit 121 determines in S110 that now is the display end timing (Yes in S110), the operation is finished.

The loop from S108 to S113 through No in S110 is repeated in a short cycle. As a result, the image processing unit 121 can display the same base image 110, and moves the hitch ball model image 204 on the base image 110 to correspond to the real-time movement of the hitch ball 6.

That is, the position of the hitch ball model image 204 on the base image 110 indicates the real-time position of the hitch ball 6 constantly.

As described above, according to the embodiment, the peripheral monitoring device superimposes on the previously (first timing) acquired rear image the hitch ball model image 204 which is identification information indicating the real-time (second timing) position of the hitch ball 6 after the first timing, and displays on the display screen 8 the rear image on which the hitch ball model image 204 has been superimposed.

Consequently, even when the hitch ball 6 is located in the dead zone of the camera 4, the identification information indicating the real-time position of the hitch ball 6 is displayed on the display screen 8. As a result, the driver can check the position of the hitch ball 6 via the display screen 8. Consequently, the peripheral monitoring device according to the embodiment can facilitate the position adjustment of the couplers.

In addition, a case where the hitch ball 6 is provided at the bottom 2b of the bed 2 and the hitch ball 6 is located in the dead zone of the camera 4 has been described above. The position at which the hitch ball 6 is provided may not be the bottom 2b of the bed 2. Furthermore, even when the hitch ball 6 is installed in the imaging region of the camera 4, the technique according to the embodiment is applicable.

For example, the hitch ball 6 is provided near a rear bumper, and a V nose type trailer is coupled with the hitch ball 6 interposed. In this case, the hitch ball 6 can enter the imaging region of the camera 4 provided to the back panel 2a. However, for position adjustment, a light amount of the imaging region of the camera 4 decreases as the vehicle 1 and the trailer approach each other, which may make images of various objects including the hitch ball 6 unclear. The peripheral monitoring device superimposes, for display, the hitch ball model image 204 on the base image 110, which is the rear image generated at previous timing at which the light amount of the imaging region has been sufficient, and consequently can display the real-time position of the hitch ball 6 intelligibly.

In addition, the peripheral monitoring device may further superimpose on the base image 110 identification information extending from the distal end of the coupler 1001 to the ground.

Figure 13:
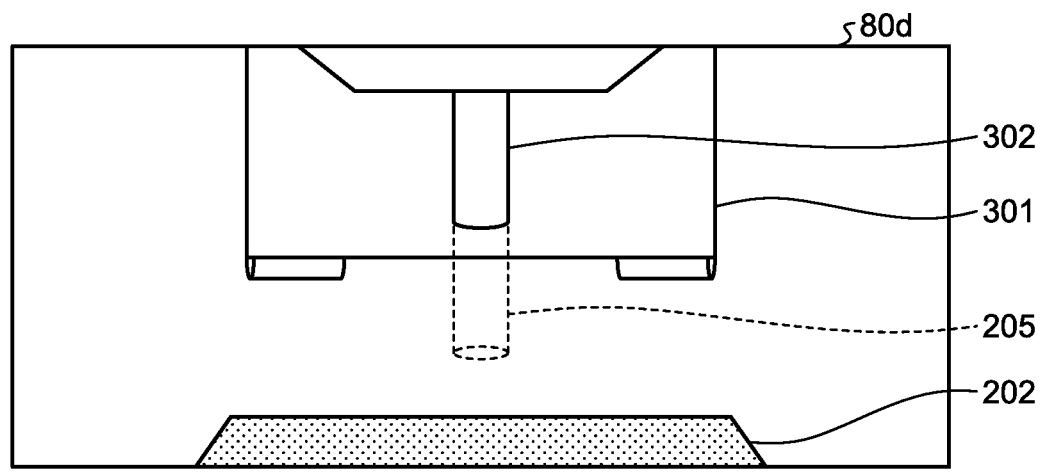
FIG. 13 is a view illustrating another exemplary display on the display screen according to the embodiment.

FIG. 13 is a view illustrating another exemplary display on the display screen 8 according to the embodiment. An image 80d shows a display example in the past image mode. The image 80d shows the trailer image 301 including the coupler image 302 similar to the image 80b. The trailer image 301 including the coupler image 302 is included in the base image, and is a live image. An object image 205 which simulates a column extending from a position indicating the distal end of the coupler image 302 to a position indicating the ground right below the distal end of the coupler 1001 is superimposed on the image 80d. By viewing the object image 205 via the display screen 8, the driver can intuitively recognize height information of the distal end of the coupler 1001.

A method for displaying the object image 205 is not limited to a specific method. In one example, a measuring device which can measure three-dimensional data of surrounding environment at the rear is provided to the vehicle 1, and the acquirer 120 acquires a measurement result from the measuring device. The measuring device is, for example, a stereo camera or a laser range scanner. The processing unit 123 computes the distance and the direction from the vehicle 1 to the coupler 1001, and the height of the distal end of the coupler 1001 based on the acquired measurement result. Furthermore, the processing unit 123 places a columnar object having the length corresponding to the height of the distal end of the coupler 1001 at the corresponding position in the virtual space 400. Furthermore, similar to a case where the vehicle model image 201 is computed from the vehicle model 101, the processing unit 123 generates the object image 205 by projecting an object on a two-dimensional plane whose viewpoint is the virtual viewpoint 402.

A method for identifying the coupler 1001 from three-dimensional data is not limited to a specific method. In one example, the image processing unit 121 displays the base image 110 on the display screen 8, and the driver touches the operation input 9 to indicate the part showing the coupler 1001 in the base image 110. By comparing the touched position and the three-dimensional data obtained from the measuring device at the substantially same timing at which the base image 110 has been generated, the processing unit 123 specifies the part corresponding to the coupler 1001 in the three-dimensional data. In another example, the processing unit 123 stores the image of the coupler 1001 in advance in the storage 122, and specifies the part showing the coupler 1001 in the base image 110 by pattern matching with the image of the coupler 1001. Furthermore, by comparing the specified part in the base image 110, and real-time three-dimensional data obtained from the measuring device at the substantially same timing as the timing at which the base image 110 has been generated, the processing unit 123 specifies the part corresponding to the coupler 1001 in the three-dimensional data.

Thus, the peripheral monitoring device can generate the object image 205 by various methods. In addition, a display mode of the identification information extending from the distal end of the coupler 1001 to the ground is not limited only to the object image 205 which simulates the columnar shape. For example, the identification information extending from the distal end of the coupler 1001 to the ground may have a linear shape.

Furthermore, the peripheral monitoring device can operate in the live mode in addition to the past image mode. In the live mode, the peripheral monitoring device immediately displays the acquired rear image on the display screen 8 after the timing of the acquisition. The peripheral monitoring device operates in the live mode, so that the driver can check the state in the imaging region of the camera 4 by the real-time live image.

Furthermore, the peripheral monitoring device transitions from the live mode to the past image mode based on the mode switch operation input, the operation input for switching the range of the transmission mechanism from the reverser range to another range, the operation input for placing the back panel 2a from the closed state to the input state, and the detection information from the sonar sensor 5 which is the distance measuring device. Thus, the peripheral monitoring device can be triggered by various events to transition between modes.

In addition, the above embodiment has described the example that the rear image acquired during mode switch is set as the base image 110. A method for selecting the base image 110 is not limited to this example. For example, the image processing unit 121 accumulates the successively acquired rear images in, for example, the storage 122 in chronological order. Furthermore, the image processing unit 121 selects the lastly acquired rear image including the coupler image 302 from a plurality of rear images accumulated in the storage 122. Furthermore, the image processing unit 121 sets the selected rear image as the base image 110.

Whether or not the rear image includes the coupler image 302 can be determined by, for example, pattern matching. The image processing unit 121 determines whether or not the successively acquired rear images include the coupler image 302 every time the rear image is acquired, and, when the decision result changes from a state where the rear image includes the coupler image 302 to a state where the rear image does not include the coupler image 302, the live mode may automatically transition to the past image mode.

Alternatively, the image processing unit 121 may set as the base image 110 the rear image acquired at a timing which goes back by a predetermined time from the mode switch timing.

Furthermore, a case where the vehicle model 101 includes the hitch ball model 104 and, in addition, the bed model 102 and the rear wheel model 103 has been described. The vehicle model 101 only needs to include the hitch ball model 104. For example, the vehicle model 101 to the bed model 102 can be omitted. Furthermore, the vehicle model 101 to the rear wheel model 103 can be omitted. A three-dimensional model which indicates a real shape of the vehicle 1 can be adopted as the vehicle model 101. A method for expressing the three-dimensional shape of the vehicle model 101 is not limited to a specific method. For example, a polygonal model, a wire frame model or a solid model can express the three-dimensional shape of the vehicle model 101.

Furthermore, the peripheral monitoring device may be configured to be able to transition from the past image mode to the live mode. After the bed 2 enters right below the coupler 1001, it is possible to place the back panel 2a in the closed state. For example, after the bed 2 enters right below the coupler 1001, the driver may switch from the past image mode to the live mode.

In addition, when the bed 2 enters right below the coupler 1001 and then the past image mode switches to the live mode, the hitch ball 6 nor the coupler 1001 is displayed on the display screen 8, and therefore the driver has difficulty in adjusting the positions. The peripheral monitoring device may store in advance the trailer image 301 acquired at an end of following position adjustment, and superimpose the trailer image 301 acquired at an end of position adjustment on the image in the live mode to display after the past image mode returns to the live mode. The trailer image 301 acquired at the end of the position adjustment is generated and stored in a case where, for example, a coupling operation has been is previously performed.

Figure 14:
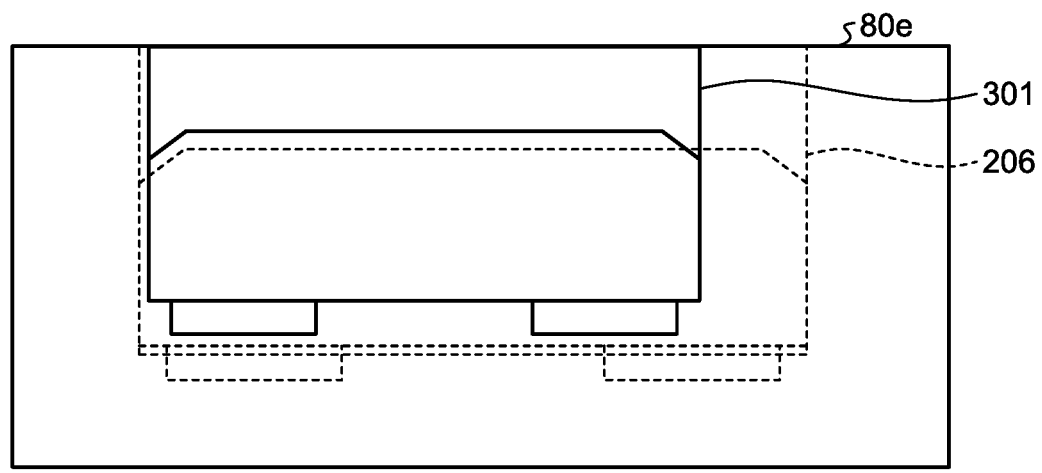
FIG. 14 is a view illustrating still another exemplary display on the display screen according to the embodiment.

The peripheral monitoring device performs various image processing on the trailer image 301 acquired at the end of the position adjustment before superimposition so as not to prevent driver's visual checking of a live image. In one example, the peripheral monitoring device extracts the outline of the trailer image 301 acquired at the end of the position adjustment, and displays the extracted outline. FIG. 14 is a view illustrating still another exemplary display on the display screen 8 according to the embodiment. In this example, an image 80e shows an outline 206 of the trailer image 301 as a dotted line. The driver can perform the position adjustment by driving the vehicle 1 such that the live trailer image 301 and the outline 206 match.

Furthermore, the peripheral monitoring device may change the display mode of the vehicle model image 201 according to the distance between the hitch ball 6 and the coupler 1001. For example, the peripheral monitoring device displays the hitch ball model image 204 in blue color when a distance between the hitch ball 6 and the coupler 1001 is larger than a preset threshold. The peripheral monitoring device displays the hitch ball model image 204 in red color when the distance between the hitch ball 6 and the coupler 1001 is smaller than the threshold. The display-mode changing method is not limited to this example. For example, the peripheral monitoring device can change from a non-blinking display to a blinking display or from a blinking display to a non-blinking display when the distance is smaller than the threshold. In another example, the peripheral monitoring device displays the bed model image 202, the rear wheel model image 203, and the hitch ball model image 204 when the distance is larger than the threshold, and displays only the hitch ball model image 204 of the vehicle model image 201 when the distance is smaller than the threshold.

Furthermore, the peripheral monitoring device may compute at optional timing a route to a position at which position adjustment of the hitch ball 6 and the coupler 1001 is finished, and control a steering angle such that the vehicle 1 travels on the computed route. Consequently, the driver can adjust the positions by operating an accelerator pedal and a brake pedal. The peripheral monitoring device may be configured to automatically accelerate or decelerate the vehicle 1 to travel on the computed route.

The above embodiment has described the example that the acquirer 120, the processing unit 123 and the output 124 are implemented by the CPU 12a's executing the program 100. The acquirer 120, the processing unit 123 and the output 124 may be partially or entirely implemented by hardware circuitry.

The program 100 can be recorded and provided in a computer-installable or executable file format on a computer-readable recording medium such as a CD-ROM, a flexible disk (FD), a CD-R, a Digital Versatile Disk (DVD) or a flash memory.

The program 100 may be configured to be stored on the computer connected to a network such as the Internet, and provided by being downloaded via the network. The program 100 can be provided or distributed via the network such as the Internet.

The program 100 can be incorporated and provided in the ROM 12c.

Similarly, the vehicle model 101 can be recorded and provided on a computer-readable recording medium such as the CD-ROM, the FD, the CD-R, the DVD or the flash memory. The vehicle model 101 may be configured to be stored on the computer connected to the network such as the Internet, and provided by being downloaded via the network. The vehicle model 101 can be provided or distributed via the network such as the Internet.

While certain embodiments have been described, the embodiment and modifications have been presented by way of example only, and are not intended to limit the scope of the invention. Indeed, the embodiment and modifications described herein may be embodied in a variety of other forms; furthermore, various omissions, substitutions, combinations and changes may be made without departing from the spirit of the inventions. The configurations and forms of the embodiments and modifications can be partially replaced with each other.

The invention claimed is:

1. A peripheral monitoring device comprising:
a processor configured to implement
an acquirer configured to acquire a first rear image of a vehicle at first timing, the vehicle including a first coupler device which couples a towed vehicle; and
an image processing unit configured to:
superimpose first identification information on the first rear image at second timing being after the first timing, the first identification information representing a position of the first coupler device at the second timing and display, on a display screen, the first rear image on which the first identification information has been superimposed, the display screen configured to be installed in the vehicle, wherein the vehicle is a pickup truck, and the first coupler device is provided on an openable bed side of the vehicle, the vehicle includes an imaging device, and the imaging device is provided on a back panel of the vehicle; and the processor is configured to switch from a first mode to a second mode and superimpose the first identification information on the first rear image to display the superimposed image when or before a second coupler device provided in the towed vehicle passes the back panel of the vehicle.

2. The peripheral monitoring device according to claim 1, wherein the image processing unit superimposes second identification information on the first rear image, the second identification information extending from a distal end of a second coupler device to a ground, the second coupler device which couples with the first coupler device of the towed vehicle.

3. The peripheral monitoring device according to claim 1, wherein the acquirer acquires a second rear image at third timing, the image processing unit displays the acquired second rear image on the display screen immediately after the third timing, the third timing is timing during an operation in the first mode, and the second timing is timing during an operation in the second mode different from the first mode.

4. The peripheral monitoring device according to claim 3, wherein the acquirer acquires an operation input for mode switch, an operation input for switching a range of a transmission mechanism of the vehicle from a reverse range to another range, an operation input for changing a tailgate from a closed state to an opened state, or detection information from a distance measuring device of the vehicle, the distance measuring device that detects a distance between the vehicle and the towed vehicle, and the peripheral monitoring device transitions from the first mode to the second mode on the basis of the acquired one of the operation inputs or the acquired detection information.

5. The peripheral monitoring device according to claim 1, wherein the back panel is placed in an opened state before the second coupler device passes the back panel.

* * * * *